June 29, 1937. W. H. HANSEN 2,085,096
FISHING TACKLE
Filed June 22, 1935
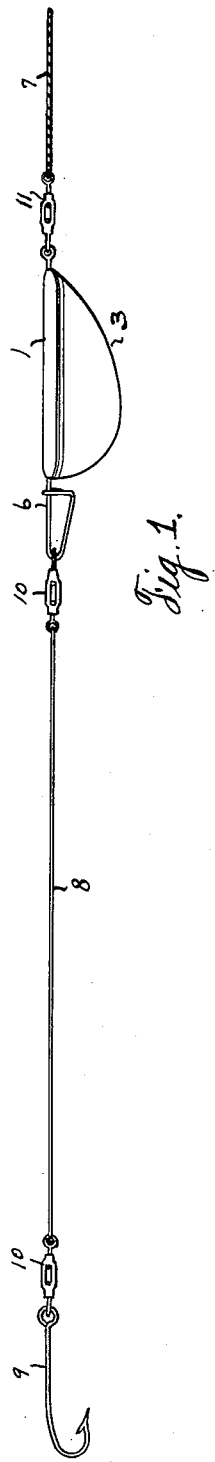
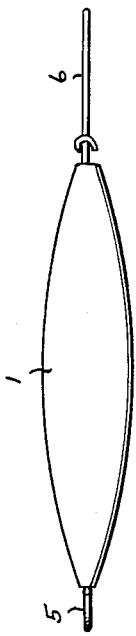
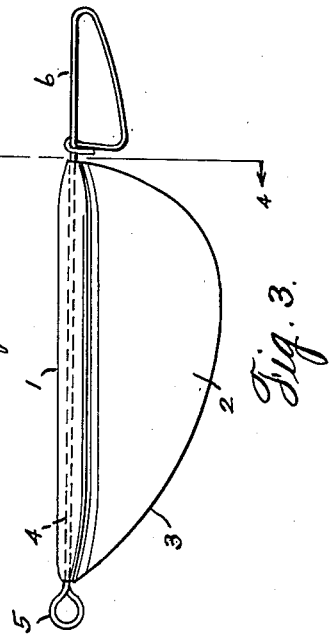
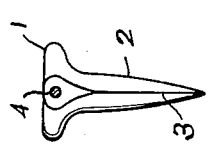
Inventor
Walter H. Hansen
By Hardway Cathey
Attorneys Patented June 29, 1937

2,085,096

UNITED STATES PATENT OFFICE 2,085,096

FISHING TACKLE

Walter H. Hansen, Freeport, Tex.

Application June 22, 1935, Serial No. 27,841

1 Claim. (Cl. 43—52)

This invention relates to fishing tackle, and has particular relation to a novel type of sinker employed.

An object of the invention is to provide a weight, or sinker, formed with a depending fin which acts as a rudder to stabilize the movements of the line while trolling.

Another object of the invention is to prevent the line from twisting and/or not twisting, and to lower the resistance on the line when the same is being drawn through the water.

With the above and other objects in view, the invention has particular relation to certain novel features of construction and use, an example of which is given in this specification and illustrated in the accompanying drawing, wherein:

Fig. 1 shows a side view of the sinker connected into the line.

Fig. 2 shows an enlarged plan view.

Fig. 3 shows a side view, and

Fig. 4 shows a cross-sectional view taken on the line 4—4 of Fig. 3.

Referring now more particularly to the drawing, the numeral 1 designates the main body of the sinker which, in plan, presents an elliptical shape. Depending from the main body of the sinker is the fin 2 which extends from end to end of the body and which tapers downwardly terminating in an arcuate edge 3. The body 1 and fin 2 are preferably composed of lead or other heavy material and are joined integrally together.

Extended through the body, there is a rod 4 whose forward end is formed into an eye 5 and whose rear end is formed into a loop 6 to which the bait lead 7 is connected.

Connected to the loop 6 there is a relatively stiff wire lead 8, to the free end of which the hook 9 is connected. The wire lead 8 is attached to the hook 9, as well as to the loop 6 by means of turnbuckles 10, 10, and the line 7 is connected to the eye 5 by means of the turnbuckle 11 so as to prevent twisting the line 7.

In use, while trolling, the fin 2 will act as a rudder to guide the tackle in a comparatively straight course. While a number of fishermen are fishing from the same boat, their lines will not be so liable to become tangled with the use of the sinker as above described.

What I claim is:

A sinker for a fishing line comprising a main elongated body portion approximately elliptical in plan and having an approximately flat upper surface and whose maximum transverse dimension is greater than its thickness, a wedge shaped fin depending from the body portion and of a length substantially the same as that of the body portion, said fin having convex sides and terminating in an arcuate edge from end to end thereof, the maximum vertical dimension of said fin being approximately twice the maximum width of the body portion and the maximum thickness of the fin being approximately one half that of the maximum width of the body portion.

WALTER H. HANSEN.